Dec. 19, 1961 J. HORNACK 3,014,122
PHOTOGRAPHIC EQUIPMENT
Filed May 11, 1959 3 Sheets-Sheet 1
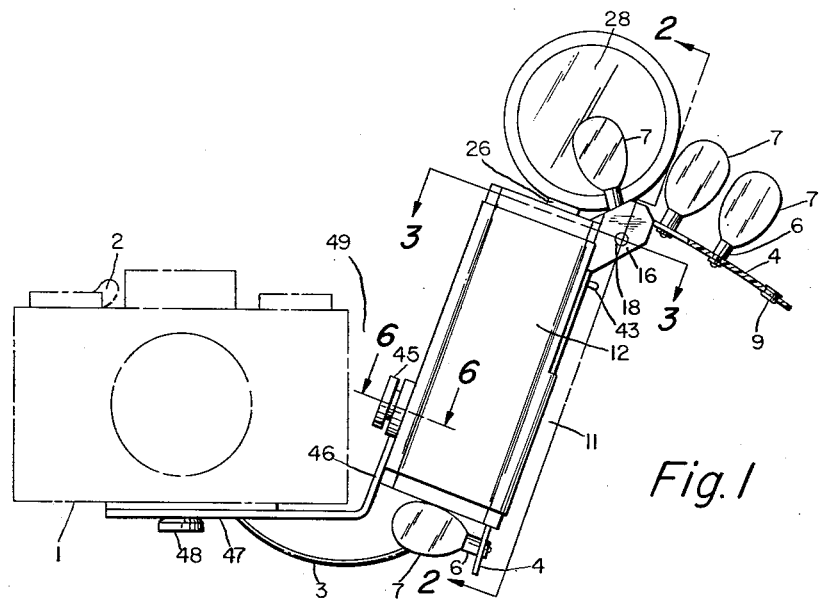
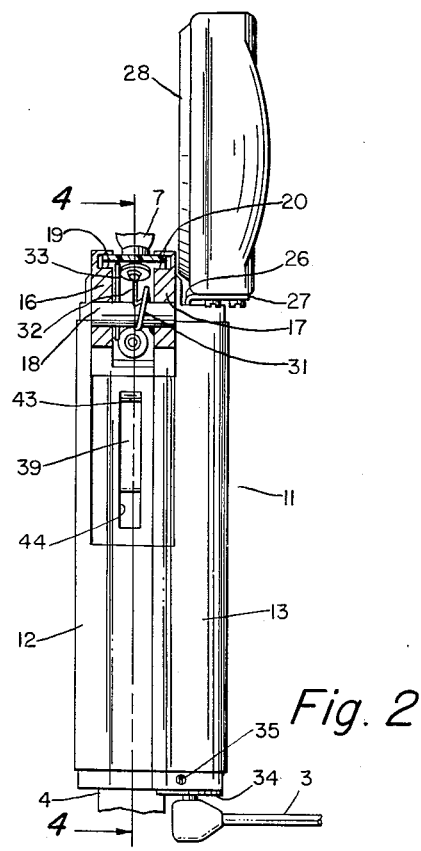
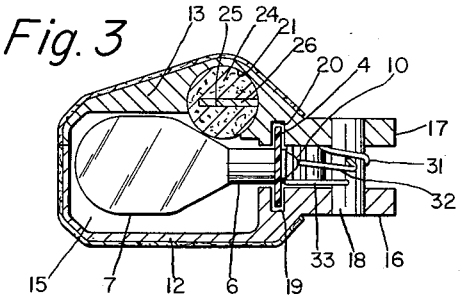
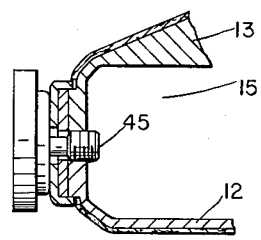
INVENTOR.
JOHN HORNACK
BY *Isler & Ornstein*
ATTORNEYS

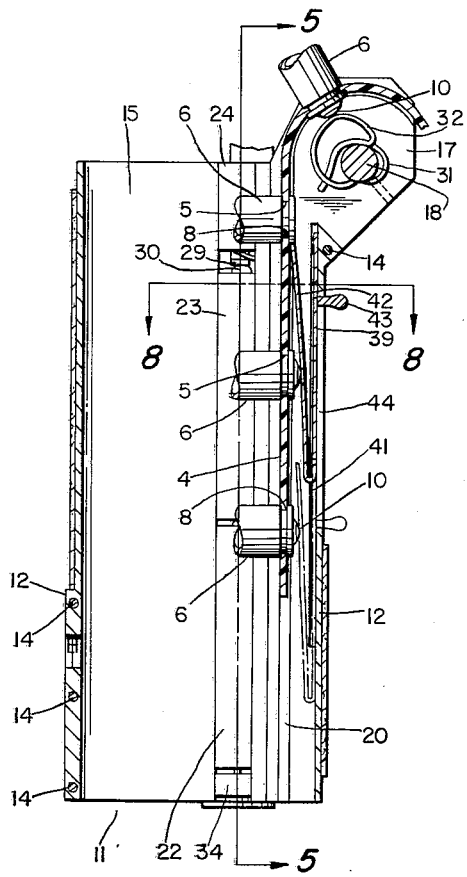
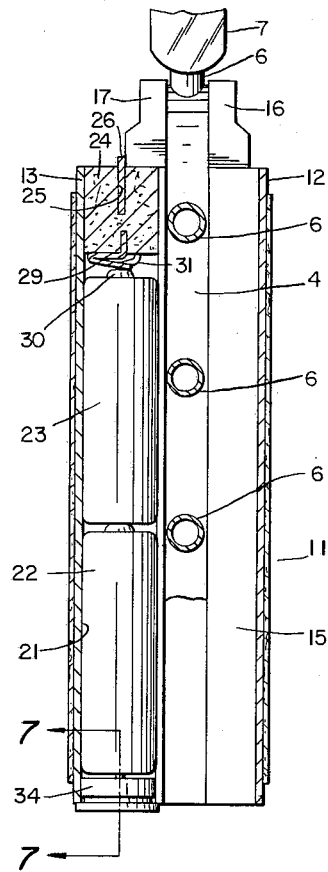
Fig. 4
Fig. 5
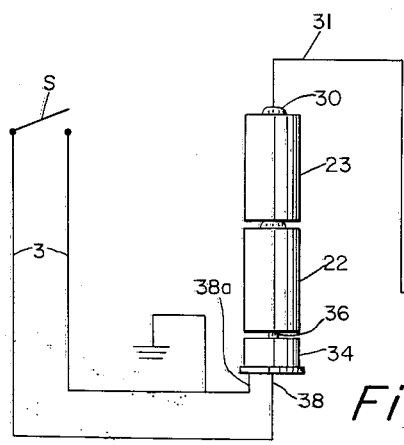
Fig. 10
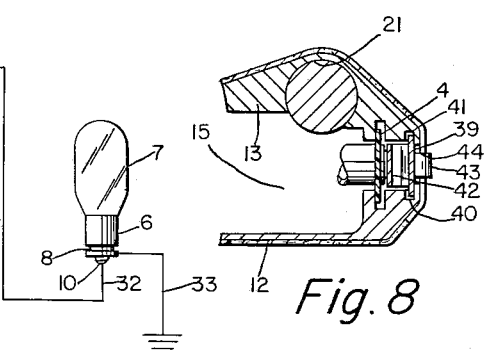
Fig. 8
INVENTOR.
JOHN HORNACK
BY *Isler & Ornstein*
ATTORNEYS Dec. 19, 1961   J. HORNACK   3,014,122
PHOTOGRAPHIC EQUIPMENT
Filed May 11, 1959   3 Sheets-Sheet 3
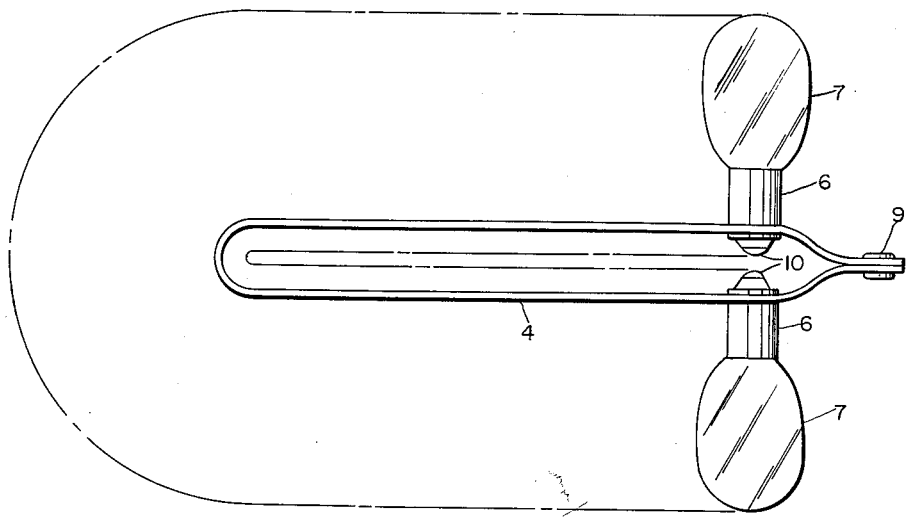
Fig. 11
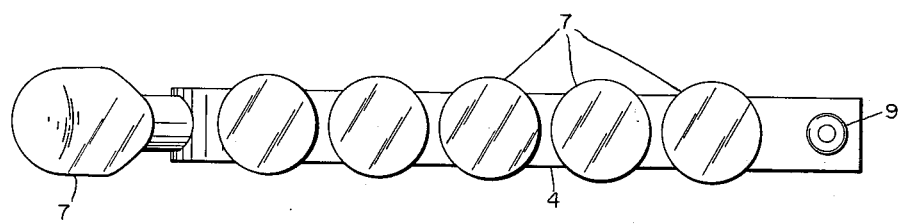
Fig. 12
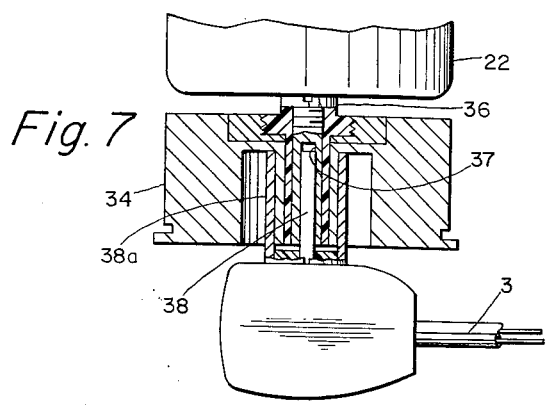
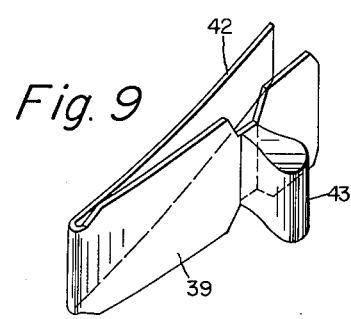
Fig. 9
INVENTOR.
JOHN HORNACK
BY
ATTORNEYS United States Patent Office 3,014,122
Patented Dec. 19, 1961

3,014,122
PHOTOGRAPHIC EQUIPMENT
John Hornack, 1207 Wexford Ave., Parma, Ohio
Filed May 11, 1959, Ser. No. 812,326
8 Claims. (Cl. 240—1.3)

This invention relates, as indicated, to photographic equipment, but has reference more particularly to a novel flash lamp or bulb cartridge or clip, to be used in conjunction with cameras, and to a novel dispensing device for dispensing or feeding the bulbs for use.

It has heretofore been common practice to use individual flash lamps or bulbs in conjunction with a reflector, and to manually or automatically eject the bulbs from the reflector, after use. This practice is disadvantageous from several standpoints, including (a) the necessity of handling hot lamps, which can burn the hands or fingers or cause other injury, (b) the ejection of the bulbs onto the floor, with its attendant problems of breakage, cleanup, injury to persons, etc., and (c) the time and energy consumed in removing, replacing, and otherwise handling the individual bulbs.

The present invention has as its primary object the provision of a unique flash bulb cartridge or clip which enables the user to provide as many as a dozen or more flash bulbs for the camera, and to use these bulbs successively, without handling or touching a single bulb, until the cartridge or clip has been used up.

Another object of the invention is to provide a novel dispensing attachment or feeder for such cartridge or clip, which can be quickly and easily attached to any camera, and by the use of which, the bulbs may be fed into proper position for use, one at a time, and without distracting the camera user from the attention required for repeated exposures by means of the camera.

A further object of the invention is to provide a novel dispensing attachment or feeder of the character described, having incorporated therein an extremely simple and practical feeding element, as well as a novel compartment for batteries and novel electrical means for energizing the bulbs.

A still further object of the invention is to provide an attachment of the character described, which is of relatively simple construction, and which can be easily manufactured and assembled, and sold at a relatively low price.

Other objects and advantages of my invention will be apparent during the course of the following description.

In the accompanying drawings forming a part of this specification, and in which like numerals are employed to designate like parts throughout the same, FIG. 1 is a front elevational view of a camera and the bulb dispensing attachment, and showing also how the bulb clip or cartridge is fed through the attachment;

FIG. 2 is a cross-sectional view, taken on the line 2—2 of FIG. 1;

FIG. 3 is a transverse cross-sectional view, taken on the line 3—3 of FIG. 1;

FIG. 4 is a cross-sectional view, taken on the line 4—4 of FIG. 2;

FIG. 5 is a cross-sectional view, taken on the line 5—5 of FIG. 4;

FIG. 6 is a fragmentary cross-sectional view, taken on the line 6—6 of FIG. 1;

FIG. 7 is a fragmentary cross-sectional view, taken on the line 7—7 of FIG. 5, and showing, on an enlarged scale, one of the electrical connections;

FIG. 8 is a fragmentary cross-sectional view, taken on the line 8—8 of FIG. 4;

FIG. 9 is a perspective view of the bulb-feeding element;

FIG. 10 is a wiring diagram, illustrating, in somewhat diagrammatic form, the electrical circuit embodied in the invention;

FIG. 11 is a side elevation view of a flash bulb cartridge or clip embodying the invention, and FIG. 12 is a top plan view of the cartridge or clip shown in FIG. 11.

Referring more particularly to the drawings, reference numeral 1 designates generally a camera of a conventional type, which, in this instance, is used for making separate exposures, and which is provided with a means, such as a lever 2, for advancing the film to a position for each exposure.

The camera 1 also has incorporated therein a switch, indicated by reference numeral S in FIG. 10, which is adapted to be closed simultaneously with the making or snapping of each exposure, so that a flash bulb may be energized by an electrical circuit (FIG. 10) controlled by such switch, when the exposure is made. In this instance, the camera 1 is provided at the rear thereof with a socket or terminal (not shown) for reception of one terminal of a cable 3, the other terminal of which is adapted for connection with the attachment which is the subject of the present invention, as will be explained hereinafter.

The invention, as stated, is concerned more particularly with the flash bulb cartridge or clip, and with the means for dispensing the flash bulbs.

The cartridge or clip is best shown in FIGS. 11 and 2 of the drawings, and comprises a thin flexible strip 4 of polyethylene or like plastic material, having a series of uniformly spaced circular openings 5 (FIG. 4) for the reception of the bases 6 of flash bulbs 7. The bases 6 of the bulbs are provided at their lower ends with annular recesses 8, the bases of which are of substantially the same diameter as the diameter of the openings 5 in the strip 4, so that the bulbs may be quickly and easily fastened to the strip by pushing the base of each bulb through the opening 5, the plastic at the edge of the opening yielding slightly to permit the base of the bulb to pass through the opening to a point at which the opening is coplanar with the annular recess 8, after which the material at the edges of the opening will enter the recess, and the bulb will be secured to the strip 4, in a desired manner.

The strip 4, with all the bulbs attached thereto may be folded into the condition shown in FIGS. 11 and 12, and the ends of the strip removably secured together by a snap fastener 9, and the cartridge or clip thus provided may be packaged or sold in this condition. The bulb is, of course, provided with a base terminal, which is identified by reference numeral 10, and which will be later referred to in connection with the operation of the device.

For the purpose of dispensing the flash bulbs, I have provided a housing or casing, generally designated by reference numeral 11, and consisting of two parts 12 and 13, which are removably secured to each other, as by screws 14.

The housing provides an open-ended hollow space 15, which is of such transverse shape or area as to permit the bulbs 7 to pass therethrough, with the axis of the bulbs extending transversely through this space, as best seen in FIG. 3.

The housing parts 12 and 13 are provided respectively with ears 16 and 17, which are provided with axially-aligned openings, in which the ends of a pin 18 of electrically insulative material are press-fitted or otherwise secured. The function of the pin 18 will be presently described.

The housing parts 12 and 13 are also provided respectively with channels or grooves 19 and 20, which extend from the bottom of the housing parts, and are curved at their upper ends along an arc which is concentric with the axis of the pin 18, as best seen in FIGS. 2 and 4. These channels or grooves are designed to receive the marginal portions of the strip 4, one end of the strip being inserted into the channel at the lower ends of the channels, the strip being then progressed through the channels in a manner which will be described, and the strip, after all of the bulbs have been used, being pulled out through the open ends of the arcuate portions of the channels (shown in FIG. 4).

The housing part 13 is provided with a recess 21, into which small batteries 22 and 23, as by pushing the batteries upwardly into the recess through the bottom of the recess. The recess 21 is closed at the top, as by a plug 24, of insulating material, the plug being press-fitted in the upper end of the recess, as best seen in FIGS. 3 and 5. The plug is provided in its upper end with a slot 25, which is adapted to frictionally receive the downturned end 26 of a bracket 27 which supports a reflector 28 for the flash bulbs. Mounted in the lower end of the plug 24 is a metallic compression spring contact 29 against which the central terminal 30 of the battery 23 bears. Soldered to this contact 29 is the bare end of an insulation covered wire 31, which passes through an opening in the part 13, encircles the pin 18, and has its other bare end anchored in the pin 18 and also soldered to one end of a bare spring wire contact 32 which encircles the pin 18, in spaced relation to the pin, the other end of the contact 32 being also anchored to the pin.

There is also secured to the pin 18, a second bare spring wire contact 33, which bears against the metallic part 12, and serves as a ground to the part 12, as will be presently explained.

As best seen in FIGS. 4, 5 and 7, the lower end of the recess 21 of the part 13 is closed as by means of a metallic plug 34, which is secured in position by a set screw 35 (FIG. 2). The plug 34 is provided with a central metallic terminal 36 which is insulated from the plug 34, and the upper end of which bears against the metallic casing of the battery 22. The terminal 36 has a socket 37 in its lower end for the frictional reception of the terminal 38 of the cable 3, the other terminal of the cable 3 being indicated at 38a.

For the purpose of advancing each of the bulbs 7 to a position in front of the reflector 28, which position is shown in FIG. 1, a feed element is provided, which is best seen in FIGS. 2, 4, 8 and 9.

This feed element comprises a flat body portion 39, the marginal portions of which ride in slots or channels 40 and 41 in the parts 12 and 13 respectively of the housing, these slots or channels lying in spaced relation to the channels 19 and 20, but in a plane parallel to the plane of the latter. The feed element is provided with an inwardly extending resilient finger 42, which extends at an angle to the body 39, but is slightly narrower than the space between the ears 16 and 17.

Secured to the body 39 is a trigger 43, which extends through an opening 44 in the rear of the housing part 12. The movement of the feed element 39—42 is determined by the length of the opening 44, since the trigger 43 abuts the ends of this opening, at the extremes of this movement. The length of the opening 44 is such that the movement of the trigger 43 is greater than the distance between the axes of the two successive bulbs, but not greater than the distance between the axes of alternate bulbs.

The dispenser attachment is adapted to be removably secured, as by a screw 45, to the arm 46 of a bracket 47, which may be secured, as by a screw 48, to the bottom of the camera 1. The bracket 47 may be provided with an elongated slot (not shown) through which the stem of the screw 48 extends so that the distance of the dispenser attachment from the camera may be adjusted or varied. The arm 46 of the bracket 47 preferably extends at an angle to the end of the camera 1, so that a space 49 is provided, into which the fingers of the left hand, which holds the attachment, may extend.

In the use of the device, one end of the strip 4 is introduced into the lower ends of the channels 19 and 20 and the strip is moved upwardly in the housing 12—13 until the base 6 of the first bulb just passes the upper end of the finger 42 of the feed element, and the upper end of the finger is directly under the base 6 of the said bulb, the feed element, at this time, occupying the position shown in broken lines in FIG. 4.

The thumb of the left hand is then used to push the trigger 43 upwardly to the position shown in solid lines in FIG. 4, that is to say, against the upper end of the opening 44. This causes the finger 42 to move the first bulb to a position which is that occupied by the bulb in FIG. 4, whose base is just above the upper end of the finger 42, as shown in solid lines in FIG. 4.

The thumb of the left hand is then used to pull the trigger 43 downwardly until it engages the lower end of the slot 44. During this downward movement, the resilient spring finger 42 will yield, so as to pass over the base 6 of the second bulb, and come to rest at the position shown in broken lines in FIG. 4.

When the trigger 43 is again pushed upwardly, the finger 42 comes into contact with the base 6 of the second bulb and pushes the second bulb upwardly to the position formerly occupied by the first bulb. At the same time, the first bulb is moved to the position in front of the reflector 28, which position is shown in FIG. 1. When the first bulb is in this position, its base terminal 10 is in frictional engagement with the wire contact 32, and the base 6 of the bulb is in frictional contact with the ground wire contact 33.

Then, when an exposure is made by the camera, and the switch S closed, the first bulb will be energized, due to the closing of the circuit shown in FIG. 10.

After the exposure has been made, the second bulb is moved, in the manner described, to the position in front of the reflector which was formerly occupied by the first bulb.

In like manner, all of the bulbs are progressed through the dispenser, and after the last bulb has been energized, the strip 4 with its burned-out bulbs, may be pulled from the dispenser, and disposed of, without injury to the fingers or hands or property, and without dropping or breakages of bulbs on the floor.

It is thus seen that I have provided a flash bulb cartridge or clip which enables the user to provide as many as a dozen or more flash bulbs for a camera, and to use these bulbs successively, without handling or touching a single bulb, until the cartridge or clip has been used up.

It is further seen that I have provided a novel dispensing attachment or feeder for such cartridge or clip, which can be easily attached to any camera, and by the use of which, the bulbs may be fed into proper position for use, one at a time, and without distracting the camera user from the attention required for repeated exposures by means of the camera, or requiring him to take his eye off the viewer or eyepiece, in making rapid or sequence exposures. In this connection, it may be noted that the camera user, while holding the camera with one hand, usually the left hand, by means of the dispenser, is free to use his other hand to make any desired adjustments of the camera and to make exposures, and without requiring his other hand to feed the bulbs.

It will be understood that various changes can be made in the invention, without departing from the spirit of the invention or the scope of the claims.

For example, the housing can be made of a single die casting or single molded part, largely of plastic. Moreover, the electrical features may be varied as to form and location.

Having thus described my invention, I claim:

1. In a device of the character described, a housing having an open-ended passageway extending therethrough and having a channel therein which is parallel with said passageway and communicates with said passageway, a flexible strip disposed in said channel for movement along said channel, said strip supporting a series of uniformly-spaced flashbulbs which extends into and transversely of said passageway and have bases extending through the strip and provided with projecting portions disposed at the side of the strip opposite that at which the flashbulbs are disposed, means for energizing said flashbulbs, and means for advancing said strip along said channel, in a step-by-step movement, to move each bulb to a position for energizing, said means disposed at the same side of said strip as that at which the projecting portions of said bases are disposed and adapted to engage the said projecting portions of the bases of said bulbs for advancing said strip.

2. A device, as defined in claim 1, in which said advancing means includes a resilient finger adapted to engage the projecting portions of said bases, and means for moving said finger between predetermined positions relatively to said housing.

3. A device, as defined in claim 2, in which said last-named means comprises a trigger, said housing having an elongated opening, through which said trigger extends.

4. A device, as defined in claim 3, in which said channel has a curved portion at one end, through which said strip moves.

5. A device, as defined in claim 4, in which said housing has a recess in its inner wall, batteries are disposed in said recess for energizing the bulbs and connections are provided from said batteries for supplying current for energizing the bulbs.

6. A device, as defined in claim 5, including a plug closing the upper end of said recess, and a reflector supported by said plug, said bulbs movable to a position in front of said reflector.

7. In a device of the character described, a housing having an open-ended passageway extending therethrough which is substantially straight for its entire length, said housing having spaced grooves which, for the major portion of their length, are substantially parallel with the direction of length of said passageway, a flexible strip having portions disposed in said grooves and movable along said grooves, said strip supporting a series of uniformly-spaced flashbulbs which extend into and transversely of said passageway and have permanent bases extending through the strip, portions of which bases are disposed at the side of said strip opposite that at which the flashbulbs are disposed, means for energizing said flashbulbs, and means for advancing said strip along said grooves, in a step-by-step movement, to move each bulb in a position for energizing, said means adapted to engage the said portions of said bases for advancing said strip.

8. A device, as defined in claim 7, in which said means comprises a member slidable in said housing in a path substantially parallel with said grooves, and having a resilient finger extending toward the side of said strip at which the projecting portions of said bases are disposed.

References Cited in the file of this patent

UNITED STATES PATENTS

| | | |
|---|---|---|
| 2,293,660 | Nicholas | Aug. 18, 1942 |
| 2,378,823 | Bartow | June 19, 1945 |
| 2,408,470 | Noel at al. | Oct. 1, 1946 |
| 2,427,736 | Noel | Sept. 23, 1947 |
| 2,604,204 | Rockey et al. | July 22, 1952 |
| 2,644,381 | Mendelsohn | July 7, 1953 |
| 2,672,039 | Schwartz et al. | Mar. 16, 1954 |
| 2,741,411 | Olden | Apr. 10, 1956 |
| 2,839,667 | Cannella | June 17, 1958 |
| 2,864,938 | Shaw et al. | Dec. 16, 1958 |
| 2,866,085 | Burroughs | Dec. 23, 1958 |
| 2,874,835 | Poupitch | Feb. 24, 1959 |
| 2,892,073 | Michatek et al. | June 23, 1959 |